(12) United States Patent
Bui

(10) Patent No.: US 8,774,154 B2
(45) Date of Patent: Jul. 8, 2014

(54) METHOD OF TRANSMITTING CONTROL INFORMATION

(75) Inventor: Thanh Bui, Victoria (AU)

(73) Assignee: NEC Corporation, Tokyo (JP)

( * ) Notice: Subject to any disclaimer, the term of this patent is extended or adjusted under 35 U.S.C. 154(b) by 759 days.

(21) Appl. No.: 12/598,466

(22) PCT Filed: Apr. 30, 2008

(86) PCT No.: PCT/JP2008/058591
§ 371 (c)(1),
(2), (4) Date: Nov. 2, 2009

(87) PCT Pub. No.: WO2008/136534
PCT Pub. Date: Nov. 13, 2008

(65) Prior Publication Data
US 2010/0091713 A1    Apr. 15, 2010

(30) Foreign Application Priority Data

May 2, 2007  (AU) ................................ 2007902317
Oct. 30, 2007  (AU) ................................ 2007231738

(51) Int. Cl.
*H04B 7/208* (2006.01)
*H04W 4/00* (2009.01)
*H04W 28/04* (2009.01)

(52) U.S. Cl.
CPC .................................... *H04W 28/04* (2013.01)
USPC ......................................... 370/344; 370/329

(58) Field of Classification Search
USPC .......................................................... 370/344
See application file for complete search history.

(56) References Cited

U.S. PATENT DOCUMENTS

| | | | |
|---|---|---|---|
| 6,456,627 B1 * | 9/2002 | Frodigh et al. | 370/465 |
| 6,668,168 B1 * | 12/2003 | Moulsey et al. | 455/434 |
| 7,948,944 B2 * | 5/2011 | Li et al. | 370/330 |
| 2004/0252662 A1 * | 12/2004 | Cho | 370/329 |
| 2005/0020260 A1 * | 1/2005 | Jeong et al. | 455/434 |
| 2006/0030342 A1 * | 2/2006 | Hwang et al. | 455/466 |
| 2006/0128309 A1 * | 6/2006 | Dateki et al. | 455/41.3 |
| 2006/0146858 A1 * | 7/2006 | Kim | 370/432 |
| 2008/0299955 A1 * | 12/2008 | Lee et al. | 455/414.1 |
| 2009/0047912 A1 * | 2/2009 | Lee et al. | 455/69 |

FOREIGN PATENT DOCUMENTS

JP    2005-109909    4/2005

OTHER PUBLICATIONS

International Search Report—PCT/JP2008/058591—Jul. 15, 2008.

* cited by examiner

*Primary Examiner* — Shaq Taha
(74) *Attorney, Agent, or Firm* — Young & Thompson

(57) ABSTRACT

In a method of transmitting a logical channel by using a downlink transport channel, a plurality of transmission configurations are limited into a limited set of the transmission configurations. Control information relating to the limited set of the transmission configurations of the downlink transport channel is transmitted and at least a part of data of the logical channel is transmitted over the downlink transport channel. Thus, an amount of the control information is reduced.

20 Claims, 5 Drawing Sheets

METHOD OF TRANSMITTING CONTROL INFORMATION

TECHNICAL FIELD

The present invention relates to methods and systems for transmission of a common channel in a communication system.

It will be convenient to describe the preferred embodiments using terminology consistent with that used by the 3rd Generation Partnership Project (3GPP). However, the present invention should not be considered as being limited to use in networks complying with 3GPP Standards.

The applicant does not concede that the prior art discussed herein forms part of the common general knowledge in the art at the priority date of the present application.

Throughout the present specification the following abbreviations and acronyms will be used.

| | |
|---|---|
| 3GPP | 3rd Generation Partnership Project |
| BCCH | Broadcast control channel - Logical channel |
| BCH | Broadcast channel - Transport channel |
| BTS | Base transceiver station |
| CCE | Control Channel Element |
| DL | Downlink |
| DL-SCH | Downlink Shared Channel - Transport channel |
| FDM | Frequency Division Multiplexing |
| PDCCH | Physical Downlink Control Channel |
| RB | Resource block |
| SI | System Information |
| SU-1 | Scheduling unit 1- SI send on DL-SCH |
| TDM | Time Division Multiplexing |
| UE | User equipment |
| BLER | Block Error Rate |
| RE | Resource Element |
| L1 | Layer 1 - Physical layer |
| L2 | Layer 2 - Layer above physical layer (L1) |
| PCCH | Paging control channel - Logical channel |
| MCCH | MB MS control channel - Logical channel |
| MTCCH | MB MS traffic channel - Logical channel |
| MIMO | Multiple Input Multiple Output antennas transmission |

BACKGROUND ART

The 3GPP has agreed certain principals for the transmission of system information over the air in future cellular communications networks, such as their so-called Long Term Evolution (LTE) networks. These principals include:
   System information (SI) is broadcast in each cell (or base station) and any UE that wants to access the service of the system needs to read the SI;
   A fixed amount of some key SI is to be sent on the broadcast transport channel (BCH);
   For the remaining SI, SI that has the same scheduling requirements (i.e. periodicity) is grouped into a scheduling unit (SU) and that is sent using downlink shared transport channel (DL-SCH). There can be multiple scheduling units which may contain a variable amount of SI. The most frequently sent SI is grouped into a scheduling unit called SU-1.
   The BCH contains scheduling information relating to SU-1 (i.e. when SU-1 is sent), and SU-1 contains scheduling information relating to other SU.
   UE needs to acquire SI on BCH and SI in SU-1 on DL-SCH at least for cell selection and reselection;
   The 3GPP has also specified coverage and performance requirement for the BCH to be 98% coverage with 1% BLER. The same coverage and performance is required for the DL-SCH carrying SU-1.

In general, the DL-SCH carries payload from the higher layer (L2 data) which can be SU or other traffic or control information. DL-SCH has a number of transmission properties or transmission configurations that the system can control to effectively deliver the data from BTS to the UE. 3GPP agreed that at least the following transmission configurations are under control of the network:
   Resource assignment for DL-SCH: i.e. how many virtual or physical resource blocks are used for the DL-SCH and their location in the system bandwidth;
   the modulation scheme used for DL-SCH: e.g. either QPSK or 16 QAM or 64 QAM;
   the transport block size (or payload size) information of the DL-SCH: this information together with number of assigned RB and modulation scheme indicates the transport block size;
   HARQ information for the DL-SCH.
   M1MO related information
   For each DL-SCH, there is a need to transmit an associated L1/L2 control channel which contains transmission configurations of the DL-SCH so that UE can receive and decode DL-SCH correctly. The transmission configurations of the L1/L2 control channel are known to the UE so that UE can receive it. The CRC bits of L1/L2 control channel are masked by some ID that only one UE that knows the ID can decode the L1/L2 control information correctly and then decode the DL-SCH. If a common ID is used then all UE sharing the same ID could decode L1/L2 control information and then decode the DL-SCH. So by varying the ID information e.g. making it common to many UE or unique to one UE, the system can use the DL-SCH for transmitting a common or dedicated logical channel respectively.

As noted above, when DL-SCH carries SU-1, the same coverage and performance requirement (98% coverage with 1% BLER) is applicable for its associated L1/L2 control channel. An exemplary estimation of the physical resource overhead required for transmission of such L1/L2 control channel is given below.

As an example, in the case of 5 MHz system, the total L1/L2 control information will be about 40 bits including the 16 bits CRC. Some preliminary evaluation by the 3GPP has shown that to achieve 98% coverage and 1% BLER, the coding rate has to be about $\frac{1}{12}$ for two transmission antennas and $\frac{1}{24}$ for one transmission antenna. Therefore, for the 40 bit payload specified above, the physical resource overhead required is 480 bits and 960 bits i.e. 240 and 480 RE, respectively, for the two antenna and one antenna cases, when QPSK modulation is used. The maximum physical resource available for transmission of all L1/L2 control channels is 800 and 850 RE for the two antenna and one antenna cases respectively, making the physical resource overhead for this L1/L2 control 30% and 56%, respectively.

Accordingly it is desirable to reduce the level of overhead for this L1/L2 control channel in such systems.

DISCLOSURE OF THE INVENTION

In a first aspect the present invention provides a method of transmitting a logical channel in a communications network using a downlink transport channel having a plurality of transmission configurations, the method including, limiting the possible transmission configurations of the downlink transport channel so as to reduce the amount of control information required by UE to receive the downlink transport channel; transmitting the control information relating to the limited set of transmission configurations of the downlink transport channel; and transmitting at least a part of the data of the logical channel over the downlink transport channel.

In one embodiment of the method the possible transmission configurations of the downlink transport channel can be limited in such a way as to reduce the required amount of control information relating to one or more types of transmission configuration.

In one embodiment of the method the possible transmission configurations of the downlink transport channel can be limited in such a way as to remove the need to transmit control information relating to one or more types of transmission configuration.

The method can further include, transmitting the control information corresponding to the selected downlink transport channel using out of band signalling. Alternatively, the method can further include, transmitting the control information corresponding to the selected downlink transport channel using in band signalling.

The transmission of the control information can be conducted without the addition of error detection information.

The data of the downlink logical channel to be transmitted is preferably a common logical channel.

In an embodiment of the present invention the possible transmission configurations of the downlink transport channel are limited to eliminate or reduce the need to signal control information relating to one or more of the following types of transmission configuration of the downlink transport channel: physical resource assignment; modulation scheme; MIMO information; HARQ information; and payload size information.

Preferably, the communications network operates in accordance with a 3GPP standard. The communications network may be an OFDM system operating according to the 3GPP Long Term Evolution (LTE).

In this case, the common logical channel can be any one of the BCCH, the MCCH, MTCCH and PCCH. The downlink transport channel can be the DL-SCH.

The method can further include: transmitting the control information corresponding to the downlink transport channel and common logical channel on the PDCCH.

In some embodiments, the method further includes: transmitting the control information corresponding to the selected downlink transport channel and common logical channel on the BCH.

The method can include configuring the downlink transport channel in one or more of the following ways to reduce the amount of control information needed to receive the downlink transport channel when carrying the common logical channel: constraining physical resource assignment of the downlink transport channel; limiting the modulation scheme to QPSK; not using HARQ in respect of data transmitted over the downlink transport channel; constrain the possible transport block size.

In some embodiments, the possible transmission configurations of the downlink transport channel can be limited such that the only control information necessary to signal the transmission configuration of the downlink transport channel is the number of resource blocks allocated on the downlink transport channel.

Preferably, the transmission of the control information is conducted without the addition of CRC error correction bits.

In some embodiments where the common logical channel is the BCCH and the downlink transport channel is the DL-SCH, the part of the common data transmitted on the DL-SCH can be a scheduling unit (SU).

The method can further include one of: signalling the transmission configuration of the PDCCH to the UE; or predefining the transmission configuration of the PDCCH.

In a second aspect, the present invention provides a base transceiver station (BTS) for use in a radio communications system, the BTS configured to communicate with a plurality of mobile terminals over a plurality of channels, said BTS being configured to transmit a at least a portion of the data of a logical channel over a downlink transport channel using a method according to an embodiment of the present invention.

In a further aspect the present invention provides communications system including a BTS operating in accordance with an embodiment of the present invention.

BRIEF DESCRIPTION OF THE DRAWINGS

Illustrative embodiments of the present invention will now be described, by way of non-limiting example only, with reference to the accompanying drawings, in which.

BEST MODE FOR CARRYING OUT THE INVENTION

It is known in designing the physical layer of modern cellular radio system to use DL-SCH extensively for the transmission of various types of information from a BTS to one or more UE. Typically, the DL-SCH carries L2 data and there is an associated L1/L2 control channel which carries control information so that the UE can correctly receive the DL-SCH.

Figure 1:
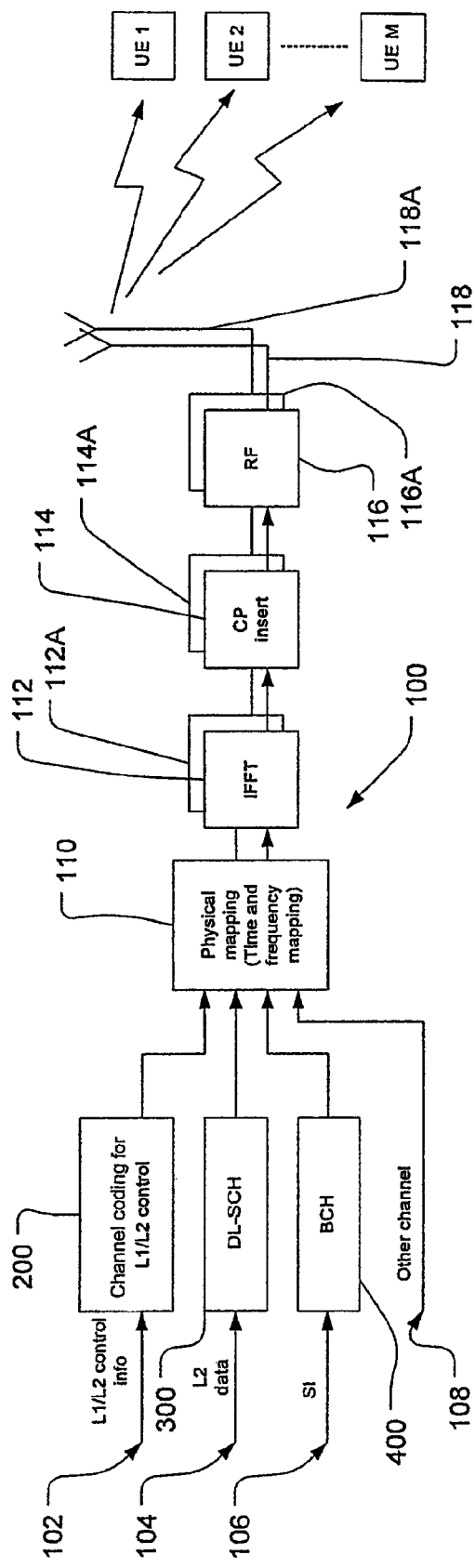
FIG. 1 is a schematic illustration of a base station, able to operate in an OFDM communication system with 2 transmit antennas broadcasting to multiple UE, according to an embodiment of the present invention.

FIG. 1 shows a schematic block diagram illustrating a BTS 100 broadcasting to multiple UE (UE$_1$, UE$_2$ ... UEM). The BTS 100 transmits a plurality of channels on a plurality of antennas. The channels illustrated in this example include the DL-SCH and BCH. As will be appreciated by those skilled in the art, other channels are also transmitted by the BTS 100, however, only those relevant to the implementation of the present invention will be discussed herein.

The BTS 100 transmits the following:
L2 data 104 using the DL-SCH 300;
Associated L1/L2 control information 102 using L1/L2 control channel 200;
SI 106 using the BCH 400; and
Data 108 representing other channels.

The outputs of processing chains 200, 300, 400 are passed to the Physical mapping block 110 to map the multitude of channels onto the physical resource (time/frequency/code etc. . . . ). After physical mapping, the signals intended for each of the antennas 118 and 118A are converted to a time domain signal in respective IFFT blocks 112 and 112A. A cyclic prefix is then added to each time domain signal by the CP insertion blocks 114 and 114A, prior to RF modulation in RF stages 116 and 116A. The resulting RF signal is then transmitted on the pair of antennas 118 and 118A.

At any rate, each of the processing chains 200, 300, and 400 in the BTS 100 may be operated together with the remaining blocks in accordance with a program which may be stored in a computer-readable medium.

Figure 2:
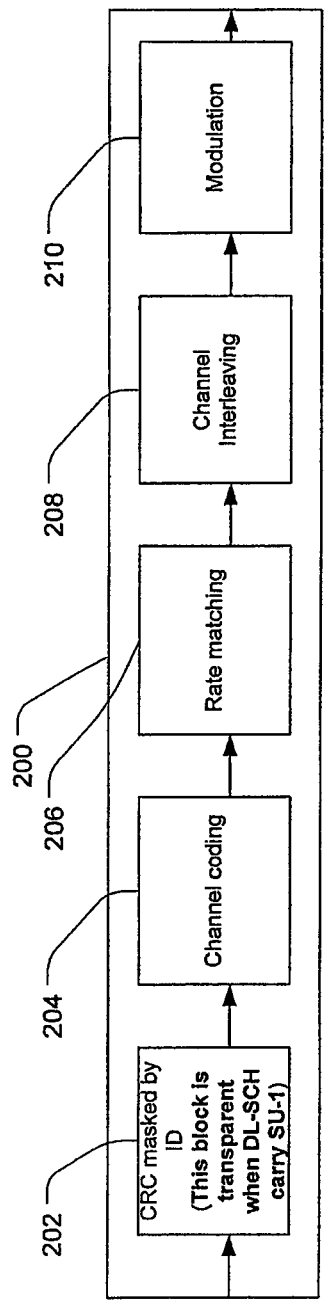
FIG. 2 is a schematic illustration of a processing chain used to process L1/L2 control information in the base station of FIG. 1.

The processing chain 200 for the L1/L2 control information 102 is illustrated in more detail in FIG. 2.

The input to this chain is the signalling information that UE needs to obtain before receiving and decoding the associated DL-SCH. For example, the L1/L2 control information 102 can include:

Physical resource assignment for the DL-SCH;
Modulation scheme for the DL-SCH;
HARQ information pertaining to the DL-SCH;
Payload size information for the DL-SCH; and
ID information to enable the UE to recognize if the control information is intended for the UE.
Other information The processing of the L1/L2 control information 102 begins in the CRC block 202. This block calculates CRC bits which are used by the UE for error detection. The calculated CRC bits are then masked by some ID so that only one UE that knows the ID can decode the L1/L2 control information 102 correctly and then decode the DL-SCH. If a common ID is used then all UE sharing the same ID could decode L1/L2 control and then decode the DL-SCH. So by varying the ID information e.g. making it common to many UE or unique to one UE, the system can use the DL-SCH for transmitting a common or dedicated logical channel, respectively.

The output of block 202 (which includes L1/L2 control information bits and masked CRC bits) passes to the channel coding block 204, then on to the rate matching block 206, to match encoded information to limited available physical resource. Next, the interleaving block 208 performs channel interlocking or interleaving that helps to improve error correction at the UE. After channel interleaving, the modulation block 210 is operated.

Figure 3:
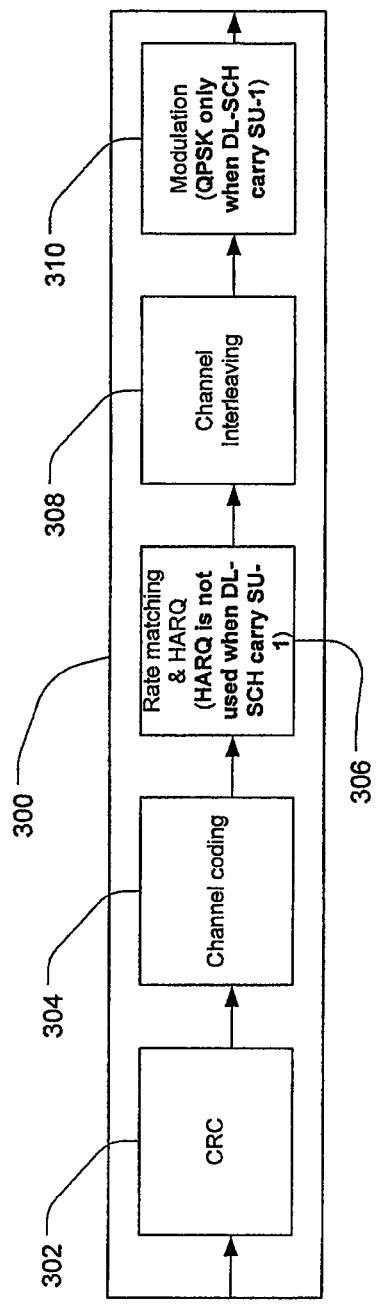
FIG. 3 is a schematic illustration of a portion of the base station of FIG. 1 configured to process the L2 data onto a DL-SCH.

The transmitting chain 300 of DL-SCH is illustrated in more detail in FIG. 3. The input 104 to the chain 300 is the L2 data block to be transmitted. The data block is first processed by a CRC attachment block 302, which calculates the CRC bits and then attaches them to the data for error detection at the UE. Next, the data block is passed to the channel coding block 304 for channel coding to further assist in error correction at the UE. Next, the data is processed by the Rate matching and HARQ block 306. Using HARQ improves throughput by using fast and adaptive retransmission in the case of errors. The rate matcher is used to match encoded information to the available physical resource. Next, the data is sent to the channel interleaving block 308 prior to modulation by the adaptive modulation block 310.

In most circumstances, the coverage requirement for a common channel is quite high as it needs to be read reliably by many UE in different locations in the cell. Therefore, if the DL-SCH is used for transmission of a common logical channel such as when SI is sent on it, then the overhead of physical resource needed for transmission of associated L1/L2 control information 102 is quite high as well. Accordingly, minimizing the size of associated L1/L2 control information associated with transmission of a common logical channel on the DL-SCH is important.

It should be noted that the DL-SCH itself is not considered as overhead as it must be transmitted anyway.

In order to address desirably to minimize overhead, the present inventor has identified the following requirements for each type of information within the L1/L2 control information 102:

Physical resource assignment for DL-SCH can be optimized (minimized). In general, physical resource assignment for a dedicated logical channel needs to be fully flexible (or fully dynamic) to maximize scheduling gain and scheduling flexibility, e.g. physical resource assignment for each UE can be made based on each UE feedback about channel state information to maximize system throughput i.e. scheduling gain. Also, L2 data intended for a UE may arrive at L1 at any time so the BTS must be able to assign any spare physical resource at that time to DL-SCH of this UE i.e. scheduling flexibility. On the other hand, physical resource assignment for a common logical channel does not need to be fully flexible because there is no scheduling gain (common channel is for all UE) and no need for scheduling flexibility because the BTS knows in advance when L2 data of the common channel will arrive at L1.

Modulation scheme for the DL-SCH can be fixed (for e.g. only QPSK is used) as adaptive modulation is normally not required for common logical channel.

HARQ information of DL-SCH can be eliminated as HARQ is normally not required for common logical channel.

Payload size information of DL-SCH can be reduced (minimized) as the code rate of a common logical channel does not have to have the level of flexibility of a dedicated logical channel.

CRC, masking by some ID information can be eliminated due to good coverage of the associated L1/L2 control channel. Also there is no need for masking associated L1/L2 control which can be transmitted in a predefined physical location known to all UE. Doing this also improves detection performance of associated L1/L2 control at the UE.

The present inventor has determined that the L1/L2 control information requirements in a 3GPP OFDM system, can be further reduced.

In this case, the HARQ information for the DL-SCH is not required for broadcast as it is fully redundant. There is also no need to include the modulation scheme used for the DL-SCH as only QPSK is used. The resource assignment contains two key pieces of information, the first being the number of RB and the second, the location of each RB within the system bandwidth.

This second information is mostly redundant as no benefit is gained from frequency scheduling, making a predefined location sufficient. The payload size of DL-SCH is also partly to fully redundant as there is no need for a high level of granularity and the code rate of the DL-SCH will be around $1/12$ or $1/24$. The 16 bits CRC is also fully redundant due to good coverage (98% coverage & 1% BLER) and there is no need for masking a common L1/L2 control channel which can be transmitted in a predefined location known to all UE.

To take advantage of this situation, in embodiments of the present invention the BTS broadcasts some SI using BCH transport channel and some SI (termed SIM) using DL-SCH. The BCH is used to transmit the scheduling information of SU-1 so that a UE knows when to receive DL-SCH carrying SU-1.

Accordingly, the payload of associated L1/L2 control information can be significantly reduced in embodiments of the present invention. For example in a 3GPP OFDM system several options are available.

Option 1:

This option enables nearly maximum reduction of associated L1/L2 control information.

The BTS can be configured to transmit only the number of RB (M) used for the DL-SCH. In this case, M implicitly indicates exactly the location of RB for data which should maximize frequency diversity, and M implicitly indicates payload size of the DL-SCH assuming that the code rate for the DL-SCH is fixed to $\frac{1}{12}$ or $\frac{1}{24}$.

Option 2:

This option provides a lesser reduction of associated L1/L2 control information compared with option 1. In this option, the BTS can be configured to transmit the resource assignment information plus payload size signalling information or other information if required.

The reduced associated L1/L2 control information in Option 1 or Option 2 above can be sent to UE using either:
  A. physical layer signalling, e.g. CCE. This technique advantageously reduces the signalling load for BCH; or
  B. in band signalling, e.g. on the BCH, which has the advantage of being very reliable.

Figure 4:
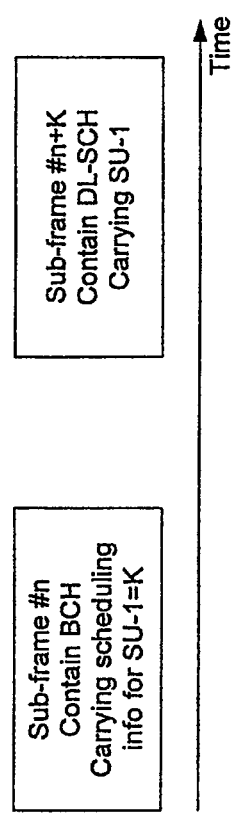
FIG. 4 illustrates the relative timing of the transmission of the DL-SCH and BCH in an embodiment of the present invention.

FIG. 4 illustrates the timing of the transmission of the scheduling information for SU-1 on the BCH and the actual transmission of SU-1 on the DL-SCH. As can be seen, the SU-1 is transmitted K sub-frames after the scheduling information is transmitted on the BCH.

If it is desirable that SU-1 is time synchronously transmitted from multiple cells (for e.g. so that UE can receive SU-1 of multiple cells in a synchronized network during a single wake up), then:

The location of M RB should be made cell specific to randomize or avoid inter cell interference; and If transmission option A is used, the associated L1/L2 control channel can be mapped onto physical RE to randomize or avoid inter cell interference.

If the CCE is mapped on to physical RE in a cell specific manner to randomize or avoid inter cell interference, then the same predefined CCE can be used for associated L1/L2 control in all cells in the system to simplify and improve reliability of associated L1/L2 control reception. Alternatively, if the CCE is mapped onto physical RE in a common way for all cells, then different CCE should be used for associated L1/L2 control in different cells, i.e. CCE carrying associated L1/L2 control is cell specific to simplify and improve reliability of associated L1/L2 control reception.

Figure 5:
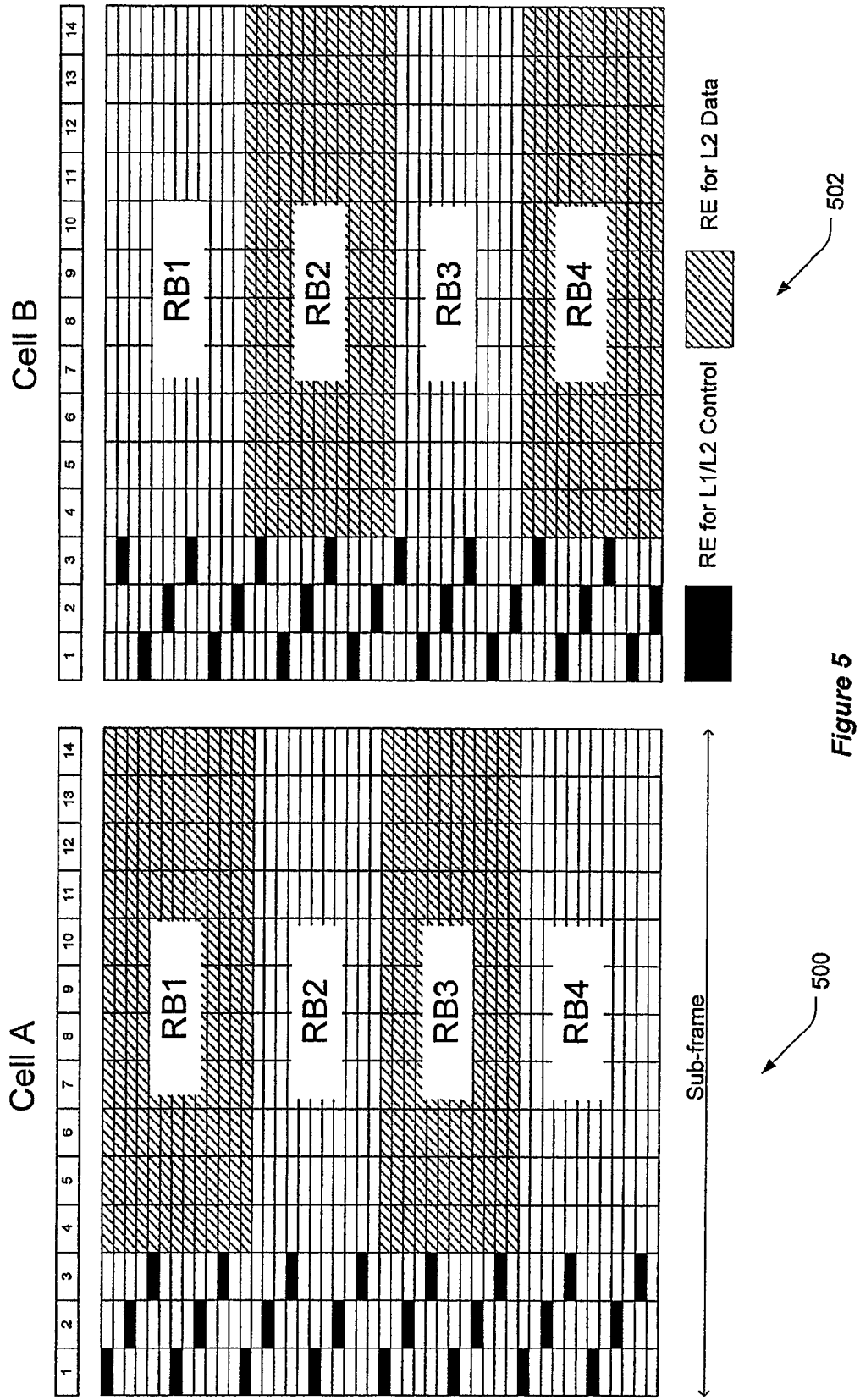
FIG. 5 illustrates the structure of a sub-frame according to an embodiment of the present invention.

FIG. 5 illustrates a pair of sub-frames 500 and 502 for a pair of neighboring cells (Cell A, Cell B) arranged in accordance with an embodiment of the present invention.

Each sub-frame spans 48 sub-carriers (illustrated as rows in the figure) and includes 14 OFDM symbols. In each sub-frame, L1/L2 control information is encoded, rate matched and sent in the 1st n OFDM symbols (n=3 is shown in the figure). The L2 data (i.e. DL-SCH) is CRC attached, encoded, rate matched and sent in the remaining OFDM symbols. The illustrated sub-frames 500, 502 illustrate an embodiment with improved interference avoidance where M=2 and there are 4 RB in the system bandwidth. As will be appreciated, each RB covers 11 OFDM symbols and 12 sub-carriers and accordingly has 132 RE assigned to it.

Using Option 1 set out above in a 5 MHz system with M=25 RB, 5 bits would be sufficient to signal the number of RB with granularity of 1 RB. This reduces the payload from 40 bits to 5 bits, and the overhead for associated L1/L2 control is reduced from 30% to 4% for two transmission antennas, and from 53% to 7% in the case of 1 transmission antenna.

It should be noted from the above description that in a BTS operating in accordance with an embodiment of the present invention, the processing chain of the associated L1/L2 control channel for a DL-SCH carrying SU-1 does not use the CRC attachment block preceding channel coding block, unlike associated L1/L2 control channel of conventional DL-SCH.

Figure 6:
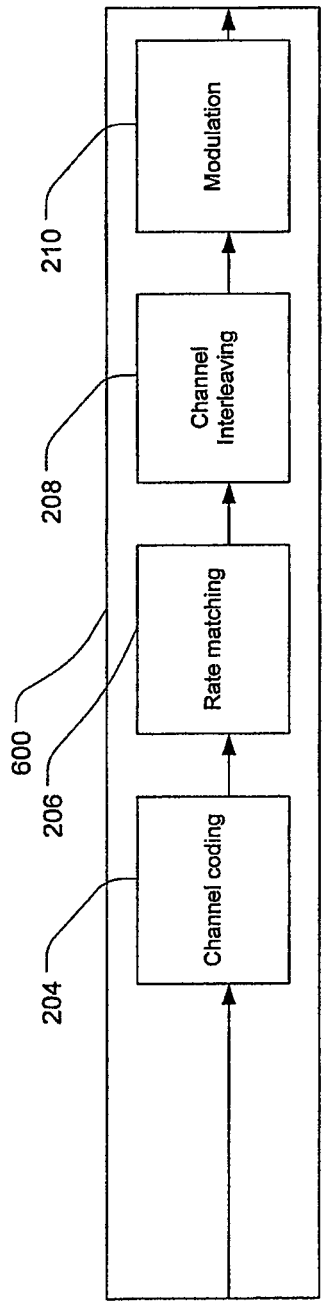
FIG. 6 is a schematic illustration of a modified processing chain used in an embodiment of the present invention to process L1/L2 control information in a base station such as that shown in FIG. 1.

FIG. 6 therefore illustrates the effective processing chain 600 used for processing the L1/L2 control channel in an embodiment of the present invention. As can be seen, it differs from that illustrated in FIG. 2 in that the CRC block 202 has no effect. Otherwise the two processing chains are the same.

Figure 7:
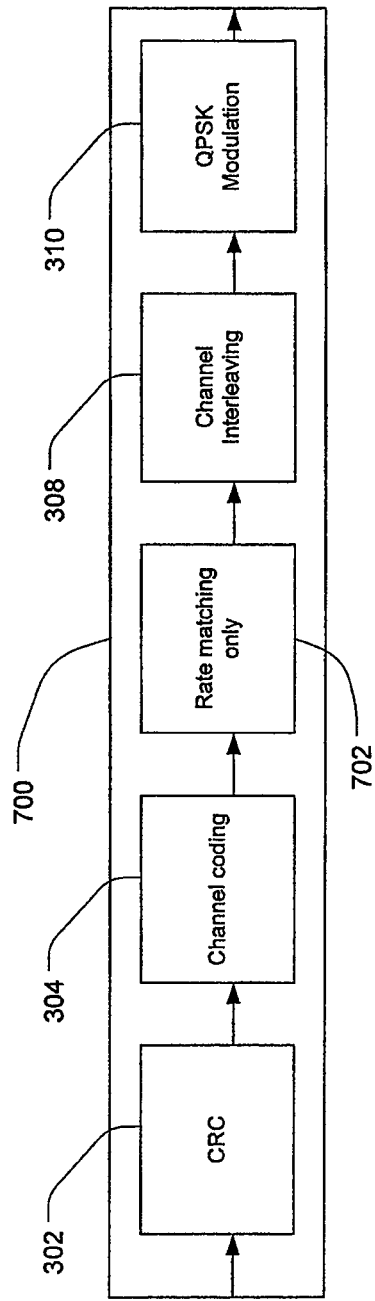
FIG. 7 is a schematic illustration of a modified processing chain used in an embodiment of the present invention to process the L2 data onto a DL-SCH in a base station similar to that shown in FIG. 1.

Similarly, FIG. 7 illustrates the effective processing chain 700 for the L2 DL-SCH data in an embodiment of the present invention. In this case, the processing only differs from the equivalent device of FIG. 3 in that the Rate matching and HARQ block operates as a rate matcher 702 only as HARQ is no longer needed. Also the modulation is always QPSK.

The preferred embodiment of the present invention provides a method for transmitting information of some DL common logical channels (such as BCCH) over a downlink shared transport channel (DL-SCH) and a method for transmitting the associated L1/L2 control information of that DL-SCH. The methods advantageously minimize the number of information bits of the associated L1/L2 control information and thus minimize physical resource overhead needed for transmission of the associated L1/L2 control information.

The minimized L1/L2 control information can be transmitted using a physical channel such as PDCCH (out band signalling) or a transport channel such as BCH (in band signalling).

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

This application is based upon and claims the benefit of priorities from Australian provisional patent application No. 2007902317, filed on May 2, 2007 and Australian complete patent application No. 2007231738, filed on Oct. 30, 2007, the disclosure of which is incorporated herein in its entirety by reference.

The invention claimed is:

1. A method of transmitting a common logical channel over a downlink transport channel having a plurality of transmission configurations, the downlink transport channel being used for transmission of the common logical channel in a 3GPP Long Term Evolution (LTE) network, the method including:
  selecting, from the plurality of the transmission configurations related to the common logical channel of the network operating according to 3GPP Long Term Evolution (LTE), possible transmission configurations of the common logical channel, and not selecting other transmission configurations of the common logical channel;
  transmitting control information relating to the selected possible transmission configurations of the common logical channel without transmitting the control information relating to the not-selected other transmission configurations which includes at least a modulation scheme; and transmitting a first part of data over the downlink transport channel without transmitting a remaining second part of the data over the downlink transport channel, to reduce the amount of the control information at least relating to the modulation scheme required by a user equipment (UE), wherein the selected possible transmission configurations of the common logical channel are selected in such a way as to remove the need to transmit control information relating to one or more types of transmission configuration.

2. A method as claimed in claim 1 wherein the selected possible transmission configurations of the common logical channel are selected in such a way as to reduce the required amount of control information relating to one or more types of transmission configuration.

3. A method as claimed in claim 1, which further includes: transmitting the control information corresponding to the common logical channel using out of band signaling without transmitting the remaining control information.

4. A method as claimed in claim 1, which further includes: transmitting the control information corresponding to the common logical channel using in band signaling without transmitting the remaining control information.

5. A method as claimed in claim 3 wherein the transmission of the control information is conducted without the addition of error detection information.

6. A method as claimed in claim 1, wherein the selected possible transmission configurations of the common logical channel are selected to eliminate or reduce the need to signal control information which relates, in addition to the modulation scheme, to one or more of the following types of transmission configuration of the downlink transport channel:
physical resource assignment;
Multiple Input Multiple Output antennas transmission (MIMO) information;
Hybrid Automatic Repeat ReQuest (HARQ) information; and
Payload size information.

7. A method as claimed in claim 1 wherein the communications network operates is an Orthogonal Frequency Division Multiplexing (OFDM) system operating according to the 3GPP Long Term Evolution (LTE).

8. A method as claimed in claim 7 wherein the common logical channel is any one of a Broadcast Control Channel (BCCH), a (MBMS Control Channel (MCCH), a Multimedia Broadcast and Multicast Service Traffic Channel (MTCCH), and a Paging Control Channel (PCCH).

9. A method as claimed in claim 7, wherein the downlink transport channel is a Downlink Shared Channel (DL-SCH).

10. A method as claimed in claim 7, which further includes: transmitting the control information corresponding to the downlink transport channel and common logical channel on a Physical Downlink Control Channel (PDCCH).

11. A method as claimed in claim 7, which further includes: transmitting the control information corresponding to the selected downlink transport channel and common logical channel on a Broadcast Channel (BCH).

12. A method as claimed in claim 7, wherein the method includes configuring the downlink transport channel in one or more of the following ways to reduce the amount of control information needed to receive the common logical channel on the downlink transport channel when carrying the common logical channel:

constraining physical resource assignment of the downlink transport channel;
determining the modulation scheme to Quadrature Phase Shift Keying (QPSK);
not using Hybrid Automatic Repeat Request (HARQ) in respect of data transmitted over the downlink transport channel; and
constraining a possible transport block size.

13. A method as claimed in claim 7, wherein the possible transmission configurations of the common logical channel are selected such that the only control information necessary to signal the transmission configuration of the common logical channel on the downlink transport channel is the number of resource blocks allocated on the downlink transport channel.

14. A method as claimed in claim 7, wherein the transmission of the control information is conducted without the addition of Cyclic Redundancy Check (CRC) error correction bits.

15. A method as claimed in claim 7, wherein the common logical channel is a Broadcast Control Channel (BCCH) and the downlink transport channel is a Downlink Shared Channel (DL-SCH) and wherein the part of the common data transmitted on the Downlink Shared Channel (DL-SCH) is a scheduling unit (SU).

16. A method as claimed in claim 10 which further includes one of:
signaling the transmission configuration of the Physical Downlink Control Channel (PDCCH) to the user equipment (UE); or
predefining the transmission configuration of the Physical Downlink Control Channel (PDCCH).

17. A base transceiver station (BTS) for use in a radio communication system of the 3GPP Long Term Evolution (LTE) operation, the base transceiver station (BTS) configured to communicate with a plurality of mobile terminals over a plurality of channels, said base transceiver station (BTS) being configured to transmit at least a portion of the data of the common logical channel over a downlink transport channel using a method as claimed in claim 1.

18. A communication system including a BTS as claimed in claim 17.

19. A non-transitory computer-readable medium containing thereon a computer program product for use in a BTS to transmit a common logical channel in a communications network of the 3GPP Long Term Evolution (LTE) operation using a downlink transport channel having a plurality of transmission configurations, the computer program, when executed on a computer, causing the computer act as the base transceiver station (BTS) and operate in accordance with the following steps of:
selecting in the communication network operating according to 3GPP Long Term Evolution (LTE), from the plurality of the transmission configurations, possible transmission configurations of the common logical channel over the downlink transport channel, and not selecting other transmission configurations of the downlink transport channel;
transmitting control information relating to the selected possible transmission configurations of the common logical channel without transmitting the control information relating to the not-selected other transmission configurations; and
transmitting a first part of the data of the common logical channel over the downlink transport channel without transmitting the remaining data of the common logical channel which includes at least a modulation scheme, to reduce the amount of the control information at least relating to the modulation scheme required by a user equipment (UE).

20. A method as claimed in claim 1, wherein the method includes configuring the downlink transport channel to reduce the amount of control information needed to receive the common logical channel on the downlink transport channel when carrying the common logical channel by not using Hybrid Automatic Repeat Request (HARQ) in respect of data transmitted over the common logical channel, wherein the selected possible transmission configurations of the common logical channel are selected in such a way as to remove the need to transmit control information relating to one or more types of transmission configuration.

* * * * *